United States Patent [19]

Atkinson

[11] Patent Number: 4,573,589
[45] Date of Patent: Mar. 4, 1986

[54] REEL STABILIZER AND EJECTION DEVICE
[75] Inventor: Walter E. Atkinson, Golden, Colo.
[73] Assignee: Engineered Data Products, Inc., Denver, Colo.
[21] Appl. No.: 497,910
[22] Filed: May 25, 1983
[51] Int. Cl.[4] ............................................. A47G 19/08
[52] U.S. Cl. .................................... 211/41; 248/214; 312/10
[58] Field of Search ...................... 211/40, 41, 113, 13, 211/71, 126, 72; 312/8, 9, 10; 206/403, 406; 248/214

[56] References Cited

U.S. PATENT DOCUMENTS 2,918,244 12/1959 Laney ................................... 248/214
3,310,178 3/1967 Wright .................................. 211/40
3,967,733 7/1976 Albrecht ........................... 211/40 X
4,014,438 3/1977 O'Toole et al. .................. 312/10 X Primary Examiner—Ramon S. Britts
Assistant Examiner—Sarah A. L. Eley
Attorney, Agent, or Firm—Klaas & Law

[57] ABSTRACT

A reel stabilizer and ejection device for use on a magnetic tape reel storage rack. The device comprises a unitary elongate resilient member having a body portion extending downwardly from the lower surface of a tape shelf and having a tape shelf engagement surface integrally connected to the upper end of the body portion and having a reel engagement portion integrally connected to the lower end of the body portion for exerting a stabilizing or ejecting force on a tape reel hung from a forward flange portion of the tape shelf.

3 Claims, 5 Drawing Figures

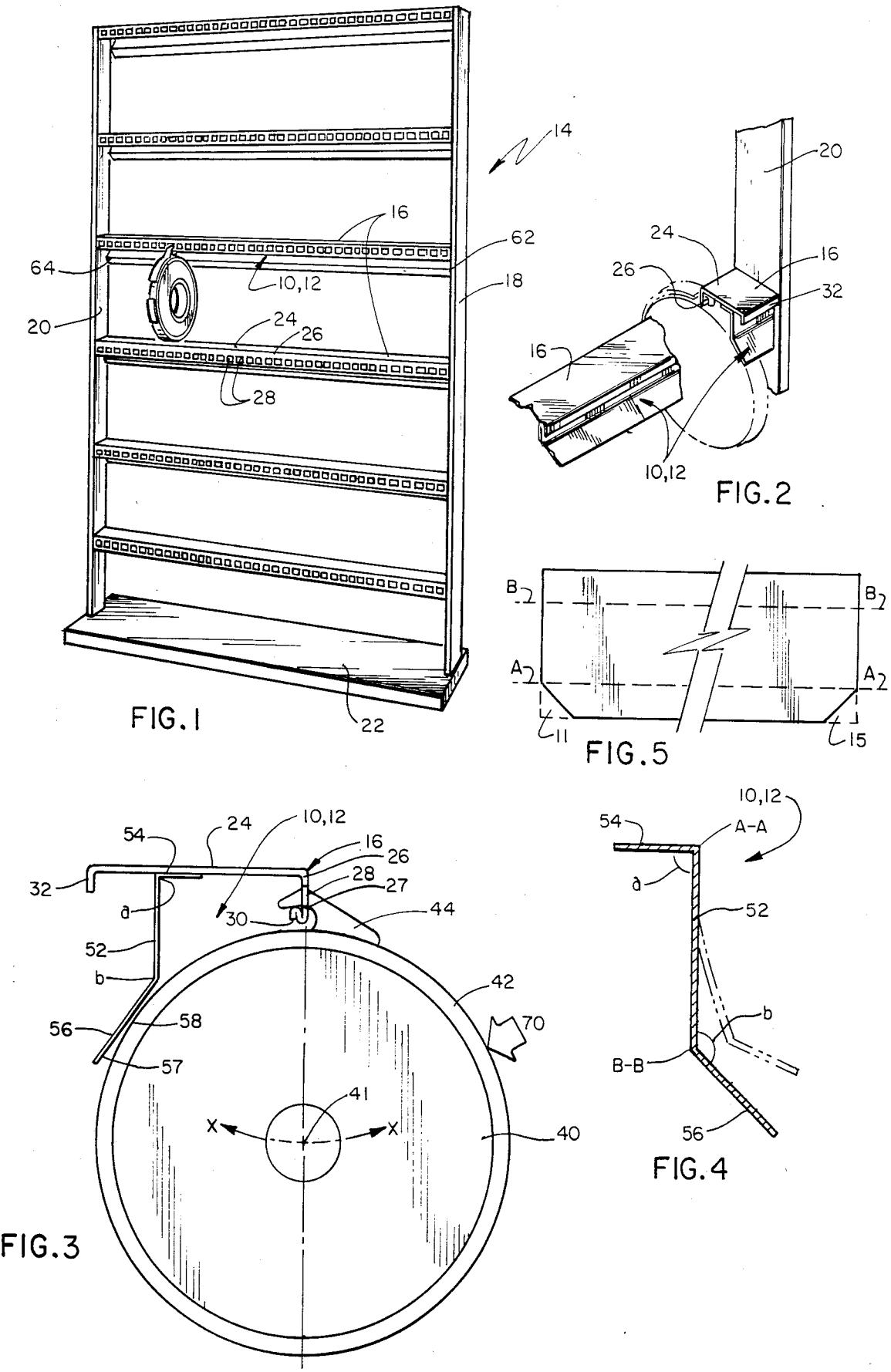

4,573,589

REEL STABILIZER AND EJECTION DEVICE

BACKGROUND OF THE INVENTION

The present invention relates generally to data processing, reel storage apparatus and more particularly to a reel stabilizer and ejection device for use on a reel storage rack.

Computer data processing requires the use of magnetically stored data. In larger computer applications this data is often stored on magnetic tape which is wound about large standard sized reels. It is common practice in the industry to store the reels in coaxially aligned rows on storage racks. The reels are generally mounted with a resilient band about the periphery thereof which contains a hook portion. The hook portion may be inserted into one of a plurality of apertures provided on a storage rack shelf enabling reels to be hung in closely spaced relationship.

The close spacing of the reels make grasping and removal of a reel difficult due to the fact that the adjacent reels prevent an operator from grasping the lateral surfaces of the reel that is to be removed.

In order to facilitate grasping and removal of the reel, prior art devices have been provided which can be used to cause a reel to spring forwardly in response to a rearwardly directed pressure exerted on the reel as by an operators finger. U.S. Pat. No. 3,310,178 issued to D. M. Wright discloses one such device. In this device a spring type hinge is used in association with an ejection bar to provide an ejection force on the rear circumferential surface of a reel.

SUMMARY OF THE INVENTION

The present invention comprises a reel stabilizer and ejection device which is used for stabilizing a reel of magnetic tape hung on a shelf of a storage rack and which is also used to selectively eject a preselected reel hung on a shelf of the rack. The device comprises an elongate unitary resilient member means which may be attached to the horizontally extending portion of a shelf. The resilient member means in the preferred embodiment has a body portion extending downwardly from the shelf which is integrally formed with an upper shelf attachment portion and a lower reel engagement portion. The reel engagement portion is preferably a planar surface positioned in tangential touching relationship with a point on the circumference of a reel hung on the shelf. In an unstressed position the reel engagement portion stabilizes the reel by providing a back support. In an elastically deformed position of the resilient member, which is produced when a reel is pushed rearwardly as by an operators hand, the reel engagement surface exerts an ejection force on the reel normal to its circumference which when the rearward force exerted by the operators hand is released causes the reel to spring forwardly from the adjacently positioned reels allowing the operator to grasp its lateral side surfaces. Thus grasped, the reel may be easily unhooked and removed from the rack.

BRIEF DESCRIPTION OF THE DRAWINGS

FIG. 1 is a perspective view of a reel mounted on a reel storage rack employing the reel stabilizer and ejection device of the present invention.

FIG. 2 is a cut away view illustrating the use and mounting of the reel stabilizer and ejection device of the present invention.

FIG. 3 is a side elevation view illustrating the mounting and use of the reel stabilizer and ejection device of the present invention.

FIG. 4 is a side elevation view illustrating the deflection produced in the reel stabilizer and ejection device of the present invention by a rearwardly directed force.

FIG. 5 is a perspective view of a sheet metal body from which the reel stabilizer and ejection device of the present invention is constructed.

DETAILED DESCRIPTION OF THE INVENTION

As illustrated in FIG. 1 the reel stabilizer and ejector means 10 of the present invention comprises an elongate unitary resilient member means 12 which may be used on a tape storage rack 14 of the type having one or more longitudinally extending tape shelves 16 supported at the ends thereof by vertical end supports 18, 20. The vertical end supports are in turn supported at the lower ends thereof as by a base means 22. Each tape shelf 16 has a horizontally extending portion 24. The horizontally extending portion has a forward vertically extending flange portion 26 attached at the forward edge thereof which may be provided as by a right angle bend in the shelf member. The forward flange portion in turn has series of closely spaced apertures 28 running from end to end thereof. The flange may also comprise a reverse bend portion 30 which serves to provide an enlarged contact surface for a reel hanger 44. The shelf may also comprise a rear vertically extending portion 32 for the purpose of providing further structural rigidity of the tape shelf.

A tape reel 40 provided with a reel band 42 about the circumference thereof having a reel hanger 44 mounted thereon may be hung from the tape shelf 16 by insertion of the reel hanger 44 into an aperture 28.

As illustrated by FIG. 5 the stabilizer and ejector means 10 is made from one piece of relatively thin, e.g. 20 to 28 gauge and preferably 24 gauge 0.024 inch), cold rolled steel sheet material which is bent in the form shown in the drawing after corners 11, 13 have been cut away to facilitate welding to the shelf.

As illustrated by FIGS. 3 and 4 the unitary resilient member means 12 comprises a relatively large width body portion 52 which extends downwardly preferably at a vertical attitude from the lower surface of the shelf horizontally extending portion 54. The body portion 52 is integrally connected at the upper end thereof to a relatively short width shelf attachment portion 54, along fold line AA. In the embodiment illustrated in FIG. 3 the attachment portion 54 extends forwardly of the body portion 52 and is welded to the shelf in a horizontal attitude. However the attachment portion 54 might also be provided in rearwardly extending relationship with the body portion 52. In the preferred embodiment the angle "a" formed by the body portion 52 and shelf attachment portion 54 at fold line AA is substantially 90°. A relatively short width reel engagement portion 56 is integrally connected to the lower end of the body portion 52 at fold line BB and in the preferred embodiment extends rearwardly therefrom at an angle "b" which in the preferred embodiment is substantially 130°. In the preferred embodiment the reel engagement portion comprises a width of substantially 0.75 inches, the body portion has a width of substantially 2.40 inches and the shelf attachment portion has a width of substantially 0.91 inches.

The reel engagement portion 56 contacts a rear circumferential surface portion of the reel 40 at a contact point 58 when the reel is deflected rearwardly. In the preferred embodiment the contact point 58 is positioned at a mid portion on a planar forward surface 57 of the reel engagement portion 56 and the reel engagement portion extends in a direction tangential to the reel surface at the contact point 58. The reel stabilizer and ejection device 10 is mounted at a distance from the tape shelf forward flange whereat the reel 40 is spaced forwardly of engagement portion 56 approximately 0.010 to 0.030 (preferably 0.020) inches when the reel is in a free hanging stationary state on the rack unbiased by outside forces.

The tape reel hook 44 provides a pivot 27 by which the tape reel is pivotally displaced along an arc XX passing through the center 41 of the reel.

When the tape reel is moved pivotally rearwardly, it engages the engagement portion 56 and exerts a rearward upward force on the surface thereof at contact point 58. The force is effective to cause resilient rearward deflection of both the engagement portion 56 and the body portion 52 about pivot axes provided by bend lines AA and BB. Since the distance from bend line AA to the point of application of the force is substantially greater than the distance from bend line BB to the force application point, there will be more pivotal movement about bend line AA than about bend line BB. When a tape reel is placed in the storage rack, engagement portion 56 acts as a stabilizer means. When a rearward force is applied to the tape reel stored in the rack, the reel to which the force is applied will be pivotally rearwardly displaced against engagement portion 56 and cause rearward resilient pivotal movement of the engagement portion 56 and the body portion 52, then the return movement of the engagement portion 56 and the body portion 52 will cause unrestricted pivotal forward movement of the tape reel beyond the adjacent stored reels. The construction and arrangement is such that the return movement of the body portion of the ejection means 10 terminates at approximately the original rest position without any significant impact on the other tape reels so that the other tape reels in the storage rack remain in the stored position while the selected reel is pivotally outwardly displaced. The elongate resilient member means 12 is sufficiently stiff to cause a reel 40 urged rearwardly against it by a rearward bias force, to deflect forwardly after sudden release of the bias force a distance at least equal to the amount of rearward deflection which was initially produced by the bias force. In the preferred embodiment the end portions 62, 64 of the unitary resilient member means 12 are not attached to the vertical supports 18, 20 and are positioned in noninterfering relationship therewith in order to facilitate the springing movement of the member 12.

It is contemplated that the inventive concepts herein described may be variously otherwise embodied and it is intended that the appended claims be construed to include alternative embodiments of the invention except insofar as limited by the prior art.

What is claimed is:

1. A reel stabilizer and ejection system for magnetic tape reel storage devices supported in side-by-side closely spaced relationship in a storage rack device having an access opening along a front side thereof comprising:

at least one longitudinally mounted elongated one-piece rigid shelf member fixedly mounted in a horizontal attitude between a pair of laterally spaced vertically extending support members of the storage rack device;

said elongated rigid shelf member having an uppermost horizontal flat rigid elongated flange portion and a forwardmost vertical flat portion and a forwardmost vertical flat elongated rigid flange portion;

a plurality of closely spaced apertures in said forwardmost vertical flat elongated rigid flange portion for support of the reel storage devices by insertion and removal of a reel hanger hook portions therefrom;

pivotal support means associated with each of said longitudinally spaced horizontally aligned aperture means for supporting engagement with the reel hook portions to hold the reel storage devices in a horizontal row in extending closely spaced adjacent vertical attitude beneath said shelf member and for enabling pivotal forward and rearward swinging movement of each reel device relative thereto;

a one-piece elongated reel abutment member made of relative thin resilient flexible sheet material having a horizontally extending attachment uppermost flange portion fixedly inflexibly mounted on the bottom surface of said uppermost flat horizontal rigid elongated flange portion of said shelf member, a vertically downwardly extending flat intermediate flange portion resiliently pivotally connected along an upper edge portion to one side edge portion of said horizontally extending fixedly mounted attachment uppermost flange portion and being resiliently deflectably movable relative thereto between a normal vertically downwardly extending stationary position and a rearwardly displaced vertically rearwardly inclined position, and a downwardly rearwardly inclined lowermost flange portion having an upper edge portion resiliently deflectably connected along a horizontally extending connecting bend portion to said intermediate flange portion and being resiliently deflectably movable relative thereto between a first normal vertically downwardly rearwardly inclined position and a second rearwardly displaced vertically further rearwardly inclined position;

the construction and arrangement of said reel abutment member being such as to locate said inclined flat lowermost flange portion at an angle which is tangent to the periphery of said reel device and to establish substantially line contact abutting engagement between only a central flat surface portion of said lowermost flat flange portion and a peripheral portion of each of said reel devices supported by said pivotal support means and whereby in said normal position said reel devices hang downwardly in said normal stored position and whereby rearward swinging movement of any selected one of said reel devices by force selectively applied to the selected one of said reel storage devices causes resilient rearward displacement of said lowermost abutment flange portion by force applied at substantially a right angle to said surface of said lowermost flange portion without transfer of force to any other adjacent storage reel device and upon removal of said selectively applied force said lowermost abutment flange portion is moved forwardly from the deflected position to the normal position by only resilient compressive forces in said abutment member which are transferred to said selected storage reel device to cause outward swinging movement of said selected reel storage device about said pivotal support means a sufficient distance outwardly beyond adjacent reel storage devices to enable the side surfaces of selected reel storage device to be grasped for removal from said storage rack without corresponding engagement with and outward movement of the adjacent storage reel devices.

2. The invention of claim 1 wherein said one-piece elongated reel abutment member extends substantially from end-to-end of said elongated rigid shelf member.

3. The invention of claim 1 wherein opposite longitudinal ends of said abutment member are positioned in noninterfering relationship with said vertically extending support members.

* * * * *